(12) United States Patent
Swan

(10) Patent No.: US 6,828,987 B2
(45) Date of Patent: Dec. 7, 2004

(54) METHOD AND APPARATUS FOR PROCESSING VIDEO AND GRAPHICS DATA

(75) Inventor: Philip L. Swan, Richmond Hill (CA)

(73) Assignee: ATI Technologies, Inc., Thornhill (CA)

( * ) Notice: Subject to any disclaimer, the term of this patent is extended or adjusted under 35 U.S.C. 154(b) by 120 days.

(21) Appl. No.: 09/923,516

(22) Filed: Aug. 7, 2001

(65) Prior Publication Data

US 2003/0030653 A1 Feb. 13, 2003

(51) Int. Cl.[7] ............................ G09G 5/00; H04N 5/44; H04N 5/445; G06F 3/00
(52) U.S. Cl. ...................... 345/660; 345/619; 345/629; 345/636; 348/553; 348/563; 725/40
(58) Field of Search ........................ 345/660, 418–420, 345/426, 428, 581–583, 584, 587, 603, 619, 629, 630, 636, 718; 348/460–461, 469, 14.13, 552–553, 555, 563, 564, 569, 575, 584, 600; 725/2, 40, 131, 153; 370/355, 537; 709/201–203, 232, 213

(56) References Cited

U.S. PATENT DOCUMENTS

| | | |
|---|---|---|
| 5,664,162 A | 9/1997 | Dye |
| 5,793,693 A | 8/1998 | Collins et al. |
| 5,844,541 A * | 12/1998 | Cahill, III .................. 345/667 |
| 5,854,620 A | 12/1998 | Mills et al. |
| 5,878,240 A | 3/1999 | Tomko |
| 5,912,676 A | 6/1999 | Malladi et al. |
| 5,937,204 A | 8/1999 | Schinnerer |
| 5,938,756 A | 8/1999 | Van Hook et al. |
| 5,949,428 A | 9/1999 | Toelle et al. |
| 5,973,696 A | 10/1999 | Agranat et al. |
| 6,064,407 A | 5/2000 | Rogers |
| 6,088,355 A * | 7/2000 | Mills et al. .................. 370/392 |
| 6,189,064 B1 | 2/2001 | MacInnis et al. |
| 6,204,863 B1 | 3/2001 | Wilde |
| 6,252,612 B1 | 6/2001 | Jeddeloh |
| 6,297,832 B1 | 10/2001 | Mizuyabu et al. |
| 6,326,984 B1 * | 12/2001 | Chow et al. ................. 345/764 |
| 6,330,036 B1 | 12/2001 | Murakami et al. |
| 6,493,036 B1 * | 12/2002 | Fernandez .................. 348/561 |
| 6,538,656 B1 * | 3/2003 | Cheung et al. ............. 345/519 |

* cited by examiner

*Primary Examiner*—Matthew C. Bella
*Assistant Examiner*—Wesner Sajous

(57) ABSTRACT

A method and apparatus is disclosed for using multiple scalers to scale video and graphics data. A video data is capable of accessing data formats not accessible by a graphics engine, pipeline, or scaler. The video data can be accessed by the video scaler and subsequently converted to a data format accessible by the graphics engine, pipeline or scaler. The converted video data can be routed to memory. Once stored in memory, the data can be accessed for further processing, such as additional scaling or graphics processing. In addition, the converted video data can be output directly to a processor, such as a graphics processor for additional processing.

14 Claims, 2 Drawing Sheets

METHOD AND APPARATUS FOR PROCESSING VIDEO AND GRAPHICS DATA

FIELD OF THE INVENTION

The present invention generally relates to the processing of video and graphics data, and more particularly to a method and apparatus accessing and using graphics data.

BACKGROUND OF THE INVENTION

The processing of video and graphics data in multimedia systems is known. Graphics data is generally associated with computer systems, and is used to generate images displayed on computer monitors. For example, graphics data can include commands specifying specific shapes or textures can be processed for display. In a typical graphics system, graphics data is provided in a RGB format. Graphics scalers are used to manipulate the viewed size of a graphics image.

Video data is generally associated with the generation of television images. Protocols for video data include both analog and digital signals. Many standard and proprietary methods for accessing video data are known. The manner in which video data is accessed affects subsequent processing of video data. For example, more efficient processing may be obtained based by accessing data that has been stored in a certain format. However, such gained efficiencies in processing are often accomplished at the cost of increasing the hardware size and design time of the video backend display engine. Once the video backend display engine has accessed the video data, the data is processed and output for display at a display device. For video data to be accessed by a graphics engine has required the graphics engine to include hardware capable of reading the video data, thereby increasing the size of the graphics engine.

Therefore, an apparatus and method capable of efficiently accessing and using video and graphics data would be useful.

DETAILED DESCRIPTION OF THE DRAWINGS

A method and apparatus is disclosed for using multiple scalers to scale video and graphics data. A video scalar is capable of accessing data formats not accessible by a graphics engine, pipeline, or scaler. The video data can be accessed by the video scaler and subsequently converted to a data format accessible by the graphics engine, pipeline or scaler. The converted video data can be routed to memory. Once stored in memory, the data can be accessed for further processing, such as additional scaling or graphics processing. In addition, the converted video data can be output directly to a processor, such as a graphics processor, for additional processing. Specific embodiments of the present invention are disclosed with reference to FIGS. 1 and 2.

Figure 1:
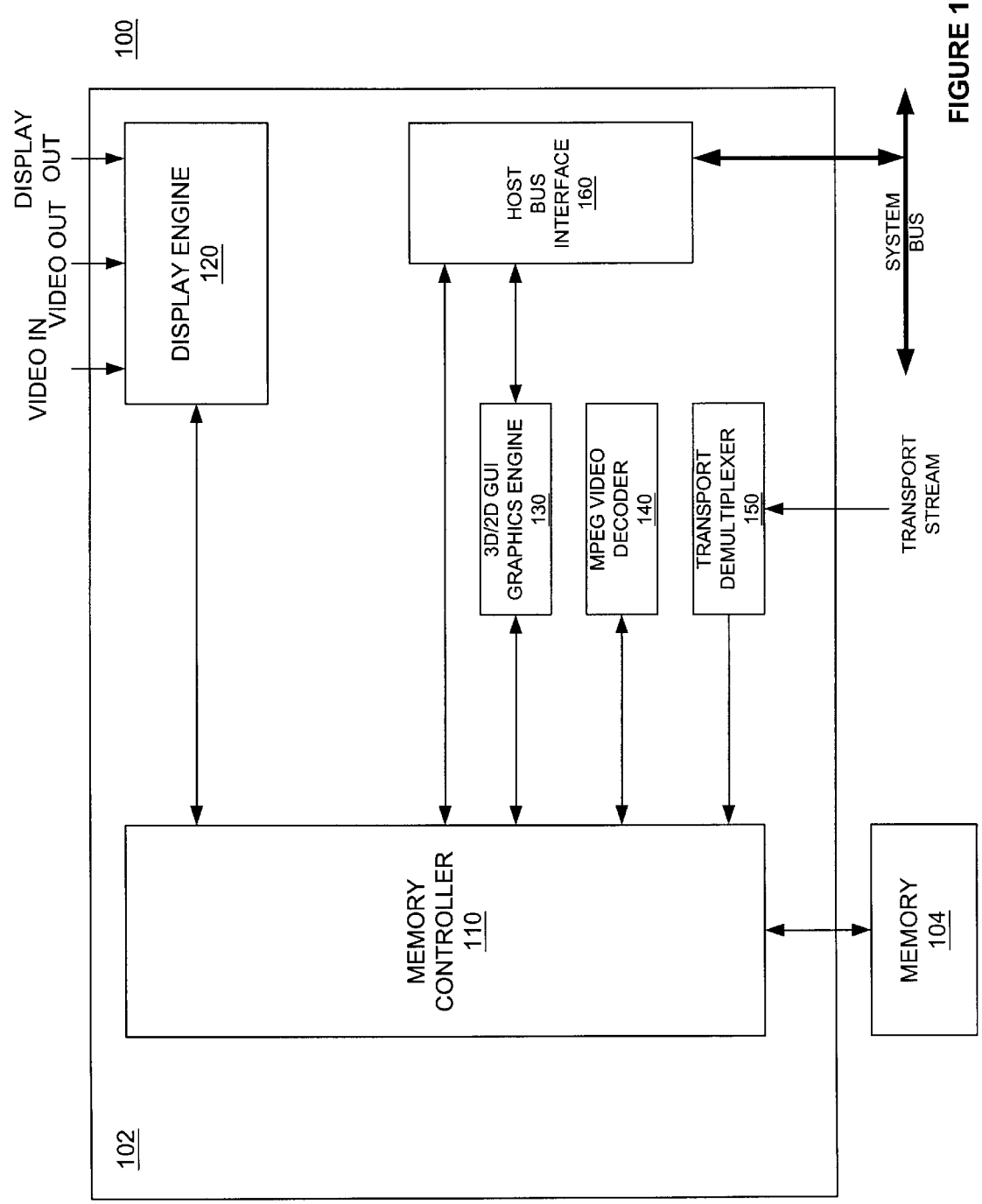
FIG. 1 illustrates, in block diagram form, a system in accordance with a specific embodiment of the present invention.

FIG. 1 illustrates a system 100 in accordance with one embodiment of the present invention. System 100 includes a video/graphics data processor 102 and memory 104. The processor 102 is bidirectionally connected to memory 104 to access data. The processor 102 can be an integrated processor, such as a monolithic semiconductor device, or a device having multiple discrete components. The memory 104 can be integrated with the processor 102, a separate memory device, or a combination of integrated and separate memory devices.

The data processor 102, includes a memory controller 110, a backend display engine 120, a 3D/2D GUI (Graphical User Interface) graphics engine 130, an MPEG video decoder 140, a transport stream demultiplexer 150, and a host bus interface 160.

Video data to the system 100 can be received by a VIDEO IN signal, or from a multiplexed data stream such as the transport stream. For example, a multiplexed data stream for carrying multiple programs is received at the transport demultiplexer 150. One example of a multiplexed data stream is an MPEG2 transport stream. The transport stream demultiplexer 150 demultiplexes the components of the transport stream allowing a desired video channel to be isolated for processing. For example, the transport stream demultiplexer 150 can be used to select only those packets associated with a specific program. In this manner, the audio and video stream of a transport stream from a service provider can be selected and provided to the memory controller 110. Subsequently, a video client (not shown) can have the video stream data provided to the display engine 120 for processing.

The VIDEO IN signal received at the backend display engine 120 represents one or more signals from a source external the system 100. For example, the VIDEO IN signal can be from a cable connection, a terrestrial signal, a broadcast signal, a DVD player, or any other video source.

The DISPLAY OUT signals represents one or more signals used by a display device to generate an image. For example, the DISPLAY OUT signal can represent RGB data for a monitor, or a NTSC signal for a conventional television receiver.

The VIDEO OUT signal represents one or more signals intended for further processing by other video or graphics devices. Generally, the VIDEO OUT signal is a representation of video data that is not generated from a display driver portion of the display engine 120, but is capable of displaying images in real time similar to a display device.

In one embodiment, the memory controller 110, at the request of a client, will provide demultiplexed video data received from the transport demultiplexer 150 to the MPEG video decoder 140. The MPEG decoder 140 provides frames of decoded MPEG video data to either the memory controller 110 for storage in memory 104, or to the host bus interface 150 for storage, or use, by a host system (not shown). In an alternate embodiment, the decoded MPEG data from the decoder 140 can be provided directly to the display engine 120 through connections not shown FIG. 1.

In another embodiment, the video data from the MPEG decoder is stored in the memory 104, which is a frame buffer memory. Note the memory 104 can include multiple portions of memory such as a memory device and a memory cache, which may be integrated on to the processing device 102.

The host bus interface 160 is connected to the system bus through which system resources, such as system memory, can be accessed. In one embodiment, graphics data can be sent and received at the graphics engine 130 through the host bus interface 160. In addition, graphics or video data can be sent and received at the memory controller 110.

In accordance with specific embodiments of the invention, display engine 120 can receive video data from memory 104 or from a VIDEO IN signal. In operation, the video data protocols capable of being received by the display engine 120 are a superset of the graphics data protocols capable of being accessed by the graphics engine 130. For example, it may be desirable to access video data in a standard or proprietary format that is not capable of being accessed by a graphics engine. For example, it may be desirable to store video data in planer tiled format. In addition, the video data can be compressed and/or interleaved. In another embodiment, the video data can be stored in a color space that is not accessible by the graphics controller.

One type of graphics data that is accessible by a video decoder and not a graphics decoder includes planar data with sub sampled UV color components as is described in pending patent application having attorney docket number ATI.0001660, filed concurrently with the present application, which is hereby incorporated herein by reference, and in patent application Ser. No. 09/186,034, Patent No. 6,326,984 filed on Nov. 3, 1998 which is hereby incorporated herein by reference, describes another embodiment of graphics data that is accessible by a video decoder.

Figure 2:
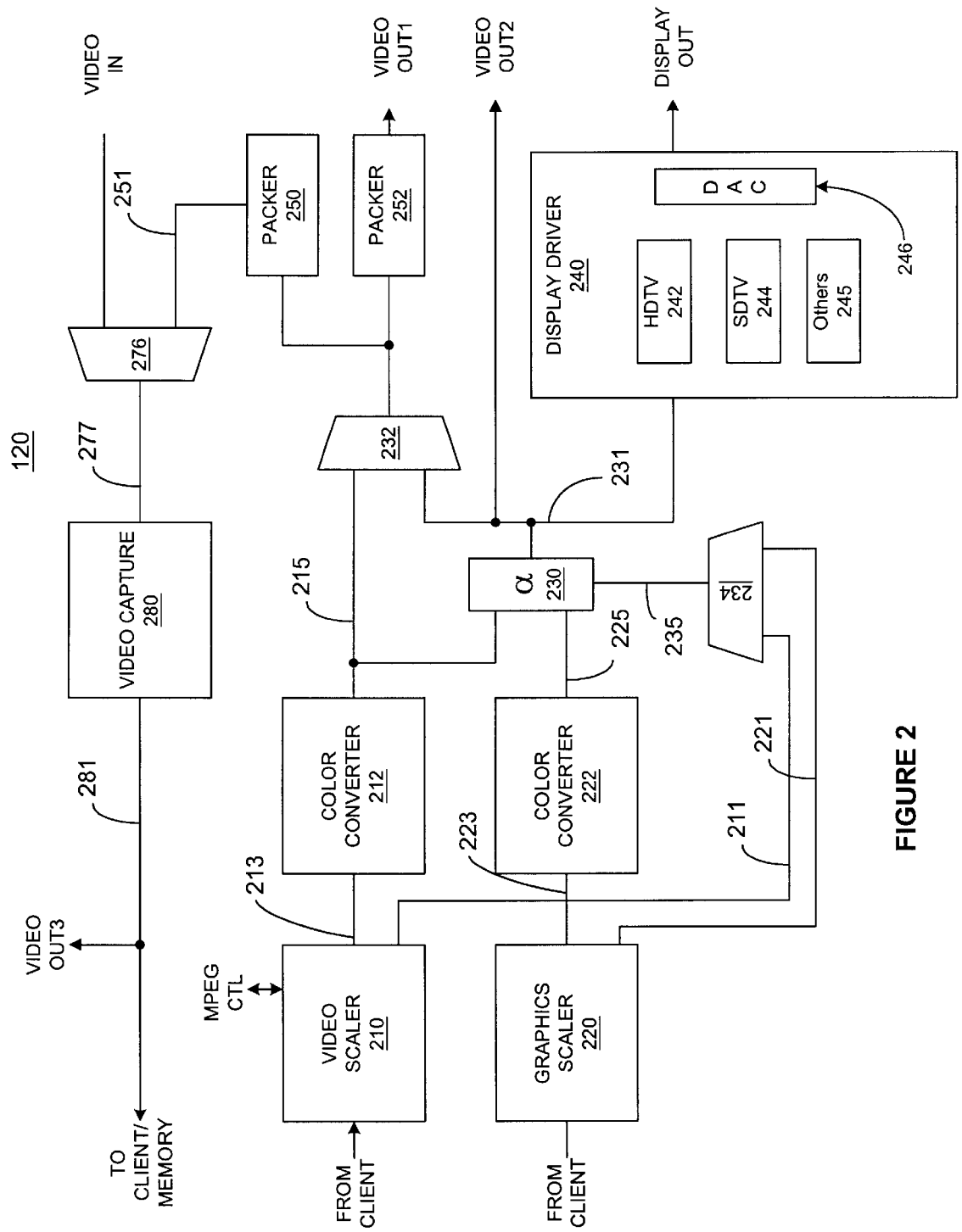
FIG. 2, illustrates, in block diagram form, portions of the display engine of FIG. 1 in detail.

FIG. 2 illustrates a specific implementation of the display engine 120 of FIG. 1. Video and graphics data is received from one or more clients (not shown) at the video scaler 210 and graphics scaler 220. An output of the video scaler 210 is connected to a color converter 212 by nodes 213. An alpha output of the video scaler 210 is connected to a first input of multiplexer 234. An output of the graphics scaler 220 is connected to a color converter 222 by nodes 223. An alpha output of the graphics scaler 220 is connected to a second input of multiplexer 234. An output of color converter 212 provides a representation of the data received from the video scaler 210 to an alpha mixer 230 by nodes 215. Likewise, an output of color converter 222 provides a representation of the data received from the graphics scaler 220 to the alpha mixer 230 through nodes 225. An output of the multiplexer 234 is connected to a control input of the alpha mixer 230 by node 233. The output of alpha mixer 230 can be provided as an output (VIDEO OUT2), received by display driver 240, or provided to as an input to multiplexer 232. Multiplexer 232 is also connected to nodes 215 from color converter 212. The output of multiplexer 232 is connected to a first video packer 252, and a second video packer 250. The output of packer 252 can be provided as a video out signal labeled VIDEO OUT1. The output of packer 250 is connected to an input to multiplexer 276. A second input to multiplexer 276 is received from the VIDEO IN signal. An output of the multiplexer 276, node 277, is connected to the video capture module 280. The output node 281 connected to the output of video capture module 280 can provide data to a requesting client or to the output labeled VIDEO OUT3.

Operation of the display engine 120 illustrated in FIG. 2 is described with reference to specific flows of data. In one embodiment, a specific data flow is initiated when a client request is received at either scaler 210 or 220. Client requests are generally received from an arbiter in response to requests from one or more specific clients (not shown).

The video scaler 210 of FIG. 2 is capable of receiving any of a set of data formats that intersects data formats capable of being received by an associated 3D engine or pipeline, such as the graphics scaler 220, or the 3D engine 130 of FIG. 1. For example, in one embodiment, the video scaler 210 can receive a video data that is tiled, planar or semiplanar, and/or compressed. For example, the MPEG video decoder of FIG. 1 can store decoded MPEG video data in memory 104 in a tiled format such that the luma component is stored in a first plane, and the chroma components are stored in one or more other planes. Some or all of the planes storing either luma and/or chroma data may be compressed. The video scaler 210 is then capable of accessing the tiled planer and compressed data from memory.

In another implementation, the video scaler 210 can interact with the MPEG decoder to receive MPEG data. This is generally accomplished by providing control signals labeled MPEG CTL, which indicate when an image from the MPEG decoder is arriving and a signal to throttle the rate at which MPEG data is sent. It will be appreciated that other formats of stored video data can be accessed in addition to, or instead of the tiled planer format described.

In yet another implementation, video data from an external source (not shown), such as an analog or digital video decoder, or an external MPEG decoder, can be received directly at a video capture port of the display engine. For example, the signal labeled VIDEO IN is received at the multiplexer 276 and flows through and the video capture portion 280 before being stored in the memory 104. Once stored in the memory 104, the captured input data can be accessed by the video scaler 210 for further processing.

In a display mode of operation, the flow of video data is through video scaler 210, color converter 212, and multiplexer 232 to packer 252. Using this data path, the video data received from a client is scaled and an appropriate color conversion performed as necessary. For example, the video scaler 210 can access video data from a planer-tiled memory and provides scaled video data to the color converter 212 in a format such as a YCbCr color data format. The color converter 212, can leave the data in this color format or convert it to a different color format such as a YPbPr format. The multiplexer 232 can be configured to allow the data from the color converter 212 to be passed to the packer 252. In one implementation, the packer 252 can be a 656 packer that provides VIDEO OUT1 data to a device capable of receiving 656-type data. Note that the VIDEO OUT1 data can be provided to a display device, or to a video capture port of a graphics card. The ability of the described data path to convert the video data received at the video scaler to other formats, allows the video data to be converted to video texture data that can be provided to a graphics engine that itself is not capable of reading the more complicated video formats capable of being read by the video scaler.

In a capture mode, the flow of video data is through video scaler 210, color converter 212, multiplexer 232, packer 250, multiplexer 276 and video capture 280 before being output for storage. Specifically, the video data is received and scaled by the video scaler 210. Next, a color conversion is performed by the color converter 212, as necessary, to adjust the data for a desired protocol. For example, the video scaler 210 can access YUV video data stored in memory in a planer tiled format and provide the scaled result in a different format such as a YCbCr or a RGB color data format. The multiplexer 232 is configured to provide the data from the color converter 212 to packer 250. From packer 250, the data is provided to the multiplexer 276, which is configured to pass data the video capture block 280. The video capture block 280 can convert the video data to yet another format, as necessary, or pass the received data along to its output. From the output of the video capture device, the data can be output at as a signal labeled VIDEO OUT3, or sent to a client, or stored in memory 104.

By storing or capturing the scaled data from the backend display engine 120 at memory 104, the video data can be scaled multiple times by scalers of the display engine 120. This allows for a degree of scaling that surpasses the single pass scaling ability of any one scaler. For example, video data can be scaled multiple times by the video scaler 210 to obtain a greater degree of scaling than is possible by the video scaler 210 with a single pass. Therefore allowing a single video scaler to be implemented that has a smaller size and/or complexity than a more robust scaler capable of greater scaling in a single pass. The repeated scaling of an image is accomplished by repeatedly accessing the stored image from memory 104 until a desired scaling is achieved. Once a desired scaling is achieved, the image may be output.

In addition to being able to scale the video data multiple times using same video scaler, the video data can be converted to a texture format and manipulated using the 2D/3D engine 130. Converting data into a texture format is advantageous because texture formats are generally designed to work efficiently with 2D/3D graphics engine. Therefore, in a specific implementation of the present invention a texture representation of the video data is provided to an output (such as one of the signals VIDEO OUT1, VIDEO OUT2, and VIDEO OUT3) for use by a graphics engine, or to store the texture data in memory 104, so that it may be accessed by an internal or external graphics engine or pipeline.

In another example, texture data stored in a memory 104 can be transferred using the host bus interface 160 the system bus to another device for display or further processing. The host bus interface can act as a bus-mastering device, or receive video data from the memory controller 110 as a client. For example, the packer 250 can convert the video data to an αRGB format. The αRGB data can be stored in memory 104 for further access. In yet another example, the stored video data, now having a graphics readable format, can be accessed by the graphics engine 130 of FIG. 1.

In another display mode, data accessible by the graphics scaler 220 flows through the graphics scaler 220, color converter 222, alpha blender 230, multiplexer 232, and packer 252. Note that the data being accessed can be data that has been previously scaled, such as converted video data being scaled a second time. In this data flow, the graphics data received from a client is scaled at graphics scaler 220, and color converted by color converter 222, as necessary. For example, the graphics data can be received at the graphics scaler 220 as an αRGB data, scaled, and provided to the color converter in αRGB format. The color converter can convert the data into different format, such as YPbPr data, or maintain the data in an αRGB format. The color component of the data from the color converter is provided to the multiplexer 232 and the alpha mixer 230. In addition, the alpha value is provided to the alpha mixer. Data that passes through the alpha mixer 230 can either be passed directly through the mixer 230 (i.e. alpha=1), or can be blended with a second data from the video path described previously. Note, the specific implementation of the display engine of FIG. 2 indicates that alpha information from either the video scaler 210 or the graphics scaler 220 can be selected through the multiplexer 234 for use by the alpha mixer 230. The alpha blended data from the alpha mixer 230 is provided to an input of the multiplexer 232. The alpha blended data can either be displayed or stored by the display engine 120 when the alpha blended data is actively selected.

An alternate data path associated with the display engine of FIG. 2 includes providing the image data from the alpha mixer 230 directly to an output as a digital data labeled VIDEO OUT2. In yet another embodiment, the alpha blended image can be provided to a display driver 240 having one or more of an HDTV encoder 242, and a SDTV encoder 244, and/or others encoders 245, such as a 656 encoder, a DVI encoder, and a scan converter. One or more digital-to-analog converter (DAC) 260 follows the encoders to provide an analog output signal as the DISPLAY OUT signal when necessary. In other embodiments, the DISPLAY OUT signal represents digital data. Where multiple encoders are supported by the display driver 240, a single DAC may be used by more than one of encoders using multiplexing techniques. In another embodiment, multiple DACs may be dedicated to specific encoders.

It will be appreciated that encoders associated with display driver 240 may support a variety of protocols. For example, an HDTV encoder may support one or more HDTV standards proposed by the Society of Motion Picture and Television Engineers (SMPTE) generally referred to as SMPTE 240 M standards, or one or more versions proposed by the International Telecommunications Union (ITU) generally referred to as ITU-R standards, or standards proposed by the Motion Picture Experts Group (MPEG). Other encoders that may be included are encoders that support standard definition television (SDTV). Such SDTV standards may specify digital or analog signals, and include standards proposed by the European Broadcasting Union (EBU), the Electronic Industries Association (EIA), the Institute of Electrical and Electronics Engineers (IEEE), the ITU and the SMPTE. Examples of such standards include versions of NTSC encoding, PAL encoding, and SECAM encoding.

It will be appreciated that the versatility of system described allows for flexible scaling and manipulation of video data. For example, multipass scaling can be accomplished by using one or more of the 3D engine 130, the video scaler 210, and the graphics scaler 220. For example, a specific frame of video data can be scaled multiple times by the video scaler 210 to obtain a desired level of scaling. In another example, a frame of video data can be first scaled by the video scaler 210 and converted to a texture format. Subsequent scaling of the data stored in texture format can be done by either the 3D engine 130 or the video scaler 210. This allows for parallel processing of data.

A specific example of parallel processing of data includes video data being received by the video scaler 210. For example, video data received by the video scaler 210 in a video format not directly accessible by the 2D/3D engine 130 or the graphics scaler 220, such as planer YUV data. The video data is then scaled and color converted as necessary to provide a desired color format to the multiplexer 232. For purposes of example, it is assumed the data stored by the video scalar as an αRGB color format that is accessible by the other scalar(s) and graphics engines. Note, degradation of the video data due to data type conversion is reduced by maintaining the video data in a common format. The αRGB data can be packed by the packer 250 before being passed through the multiplexer 276 and video capture portion 280 for storage in the memory 104. Once stored in memory 104, a client can make a request to the 3D engine 130 of FIG. 1 to further scale or process the saved video data. The 3D engine 130 can process the data in parallel with a next video data being processed by the video scaler 210 as just described. In addition, a client can request that graphics scaler 220 further process data scaled by the video scaler 210 and/or the 3D graphics engine 130. The graphics scaler 220 can work in parallel with the video scaler and/or the 3D graphics engine 130. The data from the color converter 222 can be alpha mixed with the data being processed by the video scaler 210, or the data from the color converter 222 associated with the graphics scaler can be provided to the display driver 240 for display. For example, the stored video data that has been scaled and converted through the video scaler 210 can be received at the graphics scaler 220, passed to color converted converter 222 and the alpha mixer 230, with or without alpha mixing, and provided to the video driver 240. In this manner, a single video input stream can be scaled multiple times and provided as the DISPLAY OUT signal without having to stall any of the scalers. This allows for systems that are capable of scaling data by a greater amount than any one scaler is individually capable of achieving by itself in a single path.

In the foregoing specification, the invention has been described with reference to specific embodiments. However, one of ordinary skill in the art will appreciate that various modifications and changes can be made without departing from the scope of the present invention as set forth in the claims below. For example, one of ordinary skill in the art will appreciate that the present application discloses additional data flows other than those specifically discussed. Likewise, various conversions between video formats besides those specifically listed are anticipated. In addition, the actual partitioning of the specific system can vary. For example, the DAC, or DACs, associated with the display driver 240 illustrated herein, may be incorporated onto a common semiconductor substrate with the encoders of the display driver 240, or may be discreet components separate from the encoders. In addition, it will be appreciated that not all components of the display engine 120 embodiment need be implemented, for example, only one of the packers 250 and 252 need be implemented. Likewise, additional components to the display engine 120 would be anticipated, such as additional processing modules between the VIDEO IN signal and the multiplexer 276. For example, an analog-to-digital converter or other decoder may be implemented before the multiplexer 276 Accordingly, the specification and figures are to be regarded in an illustrative rather than a restrictive sense, and all such modifications are intended to be included within the scope of present invention. Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A method of processing data using a video/graphics processor comprising the steps of:

scaling a first video data at a first scaler to generate a first scaled video data, wherein the first scaler is a video scaler;

when in a first mode of operation:

providing a representation of the first scaled video data to a video output port for real time display;

when in a second mode of operation:

providing the representation of the first scaled video data as a first scaled data to an input output port for storage in a memory accessible to the video/graphics processor, wherein the first scaled data is video data;

scaling the first scaled data at the first scaler to generate a second scaled video data;

rendering a first representation of the second scaled video data for display;

receiving a second representation of the second scaled data at a video capture module; and providing a third representation of the second scaled data to an output.

2. The method of claim 1, further comprising:

receiving a representation of the first video data from a service provider prior to scaling.

3. The method of claim 1, wherein the representation of the first video data is a multiplexed packetized data stream.

4. The method of claim 1, wherein the multiplexed packetized data stream meets a protocol specified by the motion picture experts group.

5. The method of claim 1, wherein the first scaled data is a graphics texture.

6. The method of claim 1, further comprising:

scaling the first scaled data with a second scaler that is different than the first scaler to generate a second scaled data.

7. The method of claim 6, wherein the second scaler is a graphics scaler.

8. The method of claim 6, wherein the second scaled data is a graphics texture.

9. The method of claim 6, wherein the second scaler is a video scaler.

10. The method of claim 9, wherein the second scaled data is a graphics texture.

11. The method of claim 6, wherein the second scaled data is a video data texture.

12. The method of claim 1, further comprising the step of:

alpha blending the first scaled data with a graphics texture to form an alpha blended data.

13. The method of claim 12, wherein the step of alpha blending includes receiving the graphics texture from a second scaler.

14. The method of claim 12, wherein the second scaler is a graphics scaler.

* * * * *